United States Patent

[11] 3,611,260

| [72] | Inventors | Roger J. Colardeau<br>Florham Park;<br>Don M. Shupe, Hopatcong, both of N.J. |
|---|---|---|
| [21] | Appl. No. | 870,041 |
| [22] | Filed | Oct. 28, 1969 |
| [45] | Patented | Oct. 5, 1971 |
| [73] | Assignee | Bell Telephone Laboratories, Incorporated<br>Murray Hill, N.J. |

[54] COUPLING DEVICE HAVING A CAPTIVATED NUT
7 Claims, 3 Drawing Figs.

[52] U.S. Cl. .................................................. 339/89 R,
                                                     339/90 R
[51] Int. Cl. ...................................................... H01r 13/54
[50] Field of Search ........................................... 339/88–90;
                                                     285/169, 354, 361

[56] References Cited
UNITED STATES PATENTS

| 2,497,987 | 2/1950 | Goode | 285/122 |
| 2,690,345 | 9/1954 | Anstine | 285/27 |
| 3,039,072 | 6/1962 | Robinson et al. | 339/89 |

*Primary Examiner*—Joseph H. McGlynn
*Attorneys*—R. J. Guenther and William L. Keefauver

ABSTRACT: An improved coupling device having two mating parts which are adapted to be fastened together. The improvement comprises a nut captively held within a barrel which is rotatably attached to one of the mating parts. The inner surface of the nut has lugs which are adapted to engage re-entrant sections formed in the other mating part. A plurality of spring fingers are mounted inside the barrel and engage notches cut in the nut for impeding its rotation in one direction. The fingers also press against the nut to provide friction for forcing the nut to rotate with the barrel in the opposite direction. This causes the lugs to lock inside the reentrant sections. Further rotation of the barrel advances the barrel over the nut thereby pulling the two mating parts tightly together.

PATENTED OCT 5 1971

INVENTORS R. J. COLARDEAU
D. M. SHUPE
BY
*BB Stoddard*
ATTORNEY 3,611,260

COUPLING DEVICE HAVING A CAPTIVATED NUT

GOVERNMENT CONTRACT

The invention herein claimed was made in the course of, or under contract with the Department of the Army.

BACKGROUND OF THE INVENTION

This invention relates to coupling devices and, in particular, to a quick disconnect coupling device suitable for use in connecting electrical conductors carrying radiofrequency electric energy. More specifically, the invention relates to an improved coupling device having a captivated nut adapted for use in tightly fastening two mating parts.

Coupling devices have a wide field of use, such as for connecting conduits or pipes and also for joining various electric conductors, lines, and cables. In many instances, coupling devices are required to be capable of quick disconnection. This quick disconnect capability if frequently associated with coupling devices that are used to join securely electrical conductors which are later required to be quickly disconnected.

Some quick disconnect coupling devices have employed spring pressure for maintaining their connection. Although this may be suitable for some purposes, such devices lack the positive locking feature of a threaded joint. An additional objection is that springs may be overridden by excessive pressure.

Other quick disconnect coupling devices have used cams for effecting the locking function in certain types of equipment but are not practical for use with electrical conductors operating at radio frequencies. This is due to the fact that any variation in the length of an electric conductor carrying radiofrequency energy would produce an objectionable phase shift. Therefore, the mass production of quick disconnect coupling devices employing locking cams would require such close manufacturing tolerances that their fabrication would not be feasible.

Accordingly, there is a need for an improved coupling device which will be suitable for connecting electric conductors carrying radiofrequency energy and which will be capable of quick connection and disconnection while providing reliable positive locking of the components.

SUMMARY OF THE INVENTION

The present invention is a coupling device which can be quickly connected and disconnected. It is especially suitable for use in joining radiofrequency conductors because it makes an accurately tight connection due to the fact that it utilizes the principle of a screw for providing reliable positive locking of its two mating parts. This is accomplished by employing a nut captively held within a barrel which is rotatably positioned on a ring that is attached to one of the mating parts by means of a retainer nut. The captivated nut is annular in shape and is rotatably mounted on threads formed in the interior surface of the barrel. The inner surface of the captivated nut has lugs which are adapted to engage reentrant sections formed in the other mating part. A plurality of spring fingers are mounted inside the barrel on an annular member that engages the retainer nut so as to prevent the fingers from rotating with the barrel. The ends of the spring fingers fit into notches cut in the captivated nut for impeding its rotation in one direction.

The spring fingers also press against the captivated nut to provide friction for forcing it to rotate with the barrel in the opposite direction. This causes the lugs to lock inside the reentrant sections. Further rotation of the barrel advances the barrel over the captivated nut thereby producing a screw effect which functions to pull the two mating parts tightly together in the positive manner of a threaded connection. Thus, the mating parts are quickly and securely connected by a brief rotation of the barrel to an extent that is generally less than a full turn thereof.

The mating parts can be quickly disconnected by rotating the barrel in the opposite direction. During this movement of the barrel, the pressure of the spring fingers causes the lugs on the captivated nut to move out of the reentrant sections. This serves to unlock the mating parts and thus enables them to be separated. Only a partial turn of the barrel is required to accomplish this disconnection.

BRIEF DESCRIPTION OF THE DRAWING

The features of this invention are more fully discussed hereinafter in connection with the following detailed description of the drawing in which.

DETAILED DESCRIPTION

Figure 1:
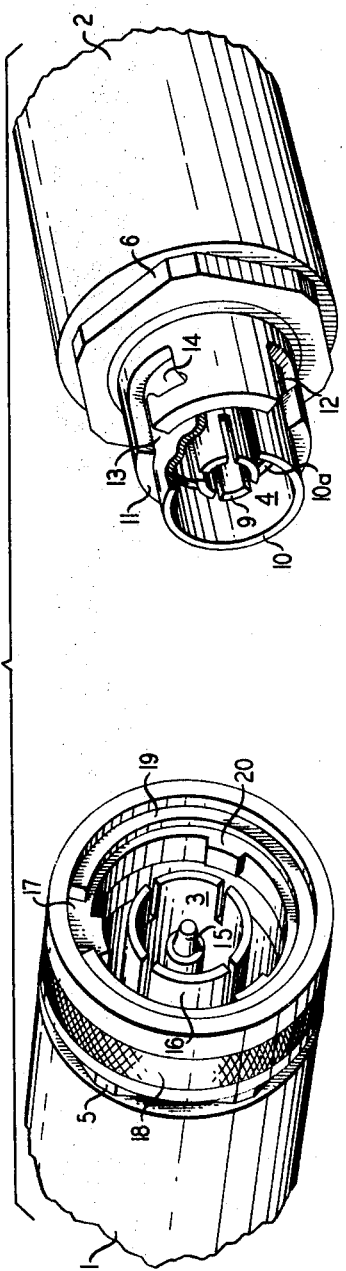
FIG. 1 is a perspective view of the coupling device of this invention attached to two mating parts prior to being connected.

The invention will now be described with reference to a specific exemplary embodiment thereof; namely, a coupling device adapted for fastening together two electric conductors carrying radiofrequency energy. As is shown in FIG. 1, the radiofrequency conductors are in the form of two coaxial cables 1 and 2 having their ends provided with suitable mating male and female coaxial connectors 3 and 4. These connectors 3 and 4 are coaxial cylindrical assemblies which are adapted to be inserted into threaded openings in the ends of the coaxial cables 1 and 2, respectively.

Figure 2:
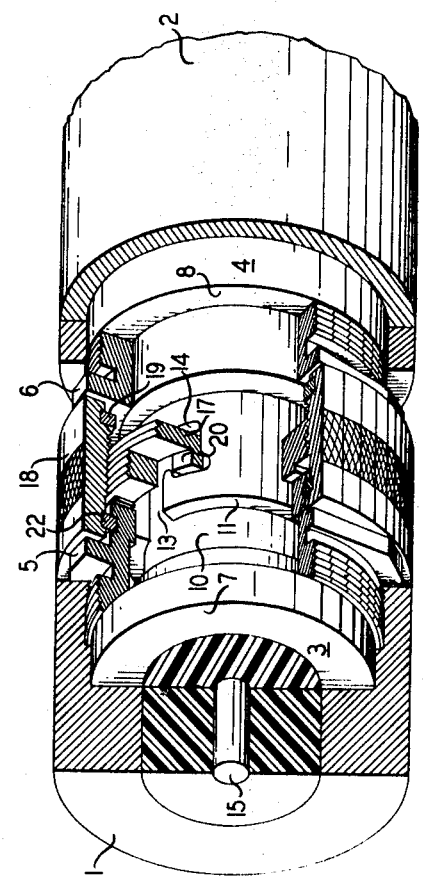
FIG. 2 is a perspective view partly in section, of the coupling device and the two mating parts in their connected condition.

The coaxial connectors 3 and 4 are held in place by retainer nuts 5 and 6 which are screwed into the threaded openings in the coaxial cables 1 and 2. These retainer nuts 5 and 6 abut respectively against shoulders 7 and 8 formed on the connectors 3 and 4 as is best seen in FIG. 2. The nuts 5 and 6 are turned until the shoulders 7 and 8 are forced against the respectively associated bases of the openings in the coaxial cables 1 and 2.

The female coaxial connector 4 comprises a central tubular connector element 9 which is positioned within an outer cylindrical connector element 10 that is formed with an interior shoulder 10a. The element 10 is encircled by a cylindrical member 11 which is one of the components of the coupling device of this invention. For convenience, the member 11 is fabricated integrally with the outer female element 10. This coupling element 11 has three reentrant sections 12 formed therein at spaced intervals around its surface. Each of the reentrant sections 12 is provided with an entrance area 13 and a locking area 14 for purposes explained hereinafter.

The male coaxial connector 3 includes a central solid connector element 15 located coaxially within an outer cylindrical connector element 16. The central male element 15 is designed to fit tightly inside the central female element 9. Also, the outer male element 16 is of such size that it will fit tightly inside the outer female element 10 and is adapted to be inserted therein until it abuts against the interior shoulder 10a on the element 10.

The outer male connector element 16 is encompassed by several components of the coupling device of this invention. These components include a nut 17 captively held within a barrel 18 by means including a C-ring 19 which is adapted to be received within an internal groove 19a formed in the right end of the barrel 18. The nut 17 is annular in shape and its inner surface has three lugs 20 formed thereon at spaced intervals corresponding to the spacing of the reentrant sections 12. The dimensions of the lugs 20 are so selected as to enable them to slide through the entrance areas 13 of the reentrant sections 12 and to move into the locking areas 14. The barrel 18 is rotatably attached to the retainer nut 5 in a manner that will now be explained with reference to FIG. 3.

Figure 3:
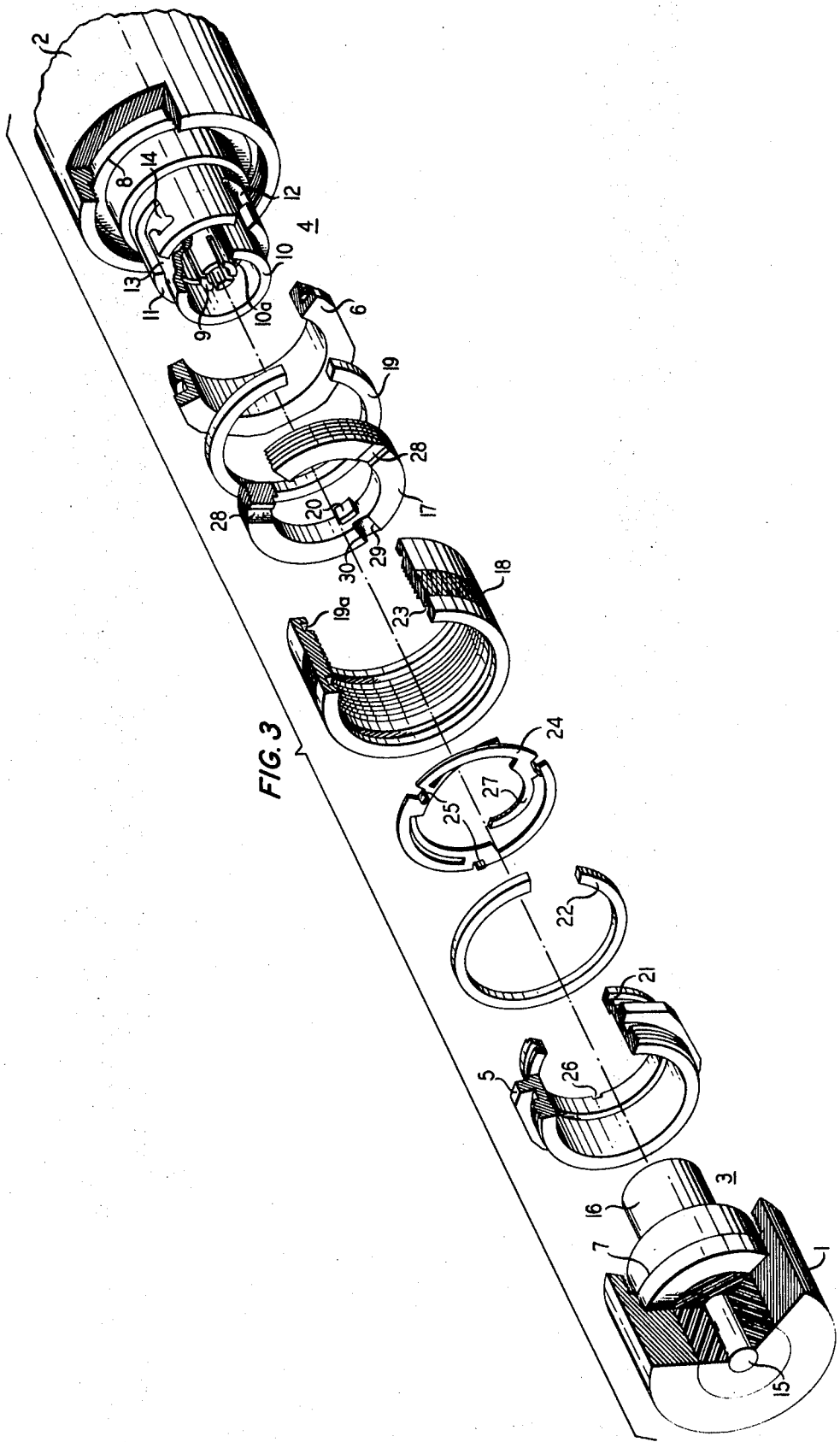
FIG. 3 is an exploded perspective view of the individual components of the improved coupling device of this invention.

It can be seen in FIG. 3 that the retainer nut 5 is provided with an external groove 21 which is adapted to receive the inner portion of a C-ring 22. It can also be seen that the left portion of the barrel 18 has an internal groove 23 formed therein which is adapted to receive the outer portion of the C-ring 22. This construction enables the barrel 18 to be rotatably positioned on the C-ring 22 so that it is thereby, in effect, rotatably attached to the retainer nut 5. The C-ring 22 also functions as additional means for captively holding the nut 17 within the barrel 18.

An annular member 24 is located inside the barrel 18 between the C-ring 22 and the captivated nut 17. This member 24 is formed with three tabs 25 equidistantly spaced around one side thereof and adapted to engage three correspondingly spaced notches 26 cut in one end of the retainer nut 5. When the member 24 is pressed against the retainer nut 5, the tabs 25 will enter the notches 26. This engagement of the tabs 25 with the notches 26 functions to hold the member 24 from rotating independently of the retainer nut 5.

The other side of the member 24 is formed with three spring fingers 27 projecting outwardly therefrom at equally spaced intervals as is shown in FIG. 3. These spring fingers 27 are adapted to press against one side of the captivated nut 17 so as to bias it in a direction toward the right end of the barrel 18. This spring pressure is designed to be sufficient for providing enough friction for normally forcing the captivated nut 17 to rotate with the barrel 18. The side of the captivated nut 17 that faces the member 24 is provided with detent means comprising three equidistantly spaced notches 28 which are adapted to engage the ends of the spring fingers 27.

As can be seen in FIG. 3, each of the notches 28 is formed with a sloping surface 29 and a blocking end portion 30. The sloping surfaces 29 facilitate the insertion of the spring fingers 27 into the notches 28. The shape of each of the end portions 30 tends to block the ends of the spring fingers 27 from moving out of the notches 28. This normally serves to impede the rotation of the captivated nut 17 in one direction which, when looking toward the right in FIG. 3, is a counterclockwise direction. When the captivated nut 17 is rotated in a clockwise direction, the spring fingers 27 merely slip out of engagement with the notches 26 while, at the same time, maintaining biasing pressure against the captivated nut 17.

When it is desired to couple the male coaxial connector 3 on the coaxial cable 1 to the female coaxial connector 4 on the coaxial cable 2, the first step is to cause the captivated nut 17 to assume a position near the right end of the barrel 18. This is accomplished by rotating the barrel 18 in a counterclockwise direction as viewed when looking toward the right in FIG. 3. During this rotation, the barrel 18 merely turns around the C-ring 22 which is mounted on the retainer nut 5. As was stated above, the restrictive means comprising the spring fingers 27 and the notches 28 impede counterclockwise rotation of the captivated nut 17. Accordingly, the captivated nut 17 will initially be prevented from rotating and the counterclockwise rotation of the barrel 18 will drive the captivated nut 17 toward the front end of the barrel 18 until it abuts against the C-ring 19.

The male connector 3 is now pushed into the female connector 4 with the central male coaxial connector 15 being inserted into the central female coaxial connector 9 and the outer male coaxial connector 16 being inserted into the outer female coaxial connector 10. At this time, the connecting parts are not fully coupled because the lugs 20 on the captivated nut 17 will ordinarily be abutting against the front end of the cylindrical coupling member 11 which encircles the outer female coaxial connector 10.

Positive locking and fastening of this connection is attained by reversing the rotation of the barrel 18 so that it now rotates in a clockwise direction. Due to the pressure exerted by the spring fingers 27, the captivated nut 17 will follow the clockwise rotation of the barrel 18. When the lugs 20 become aligned with the entrance areas 13 of the reentrant sections 12 formed in the coupling member 11, the barrel 18 is pushed forward toward the coaxial cable 2 thereby sliding the lugs 20 into the entrance areas 13 until the lugs 20 abut against the rear portions of the reentrant sections 12. Further clockwise rotation of the barrel 18 produces corresponding clockwise rotation of the captivated nut 17 thus moving its lugs 20 into the locking areas 14 of the reentrant sections 12. Additional clockwise rotation of the captivated nut 17 is terminated when its lugs 20 move into abutment with the side edges of the locking areas 14.

With the captivated nut 17 thus held from rotation, continued rotation of the barrel 18 in a clockwise direction will cause the barrel 18 to advance over the captivated nut 17. In other words, the barrel 18 moves forward toward the coaxial cable 2 thereby compressing the spring fingers 27. This, in effect, causes the captivated nut 17 to be forced or drawn toward the left end of the barrel 18 which is that end which is mounted on the C-ring 22. This movement of the captivated nut 17 pulls the lugs 20 further into the locking areas 14 of the reentrant sections 12 until the lugs 20 abut against the left edges of the locking areas 14. This serves to lock the mating connectors 3 and 4 securely together.

During this time, the rotation of the barrel 18 produces a screw effect which functions to pull the male connector 3 and the female connector 4 tightly together in the positive manner of a threaded connection until the front end of the outer male element 16 abuts against the interior shoulder 10a of the outer female element 10. This tightening process is accomplished in part by means of the cylindrical member constituted by the retainer nut 5 which encircles the male connector 3. Since the retainer nut 5 is secured to both the male connector 3 and the barrel 18, it responds to the above-mentioned continued rotation of the barrel 18 by following its axial movement toward the right in FIG. 3 thereby forcing the male connector 3 further inside the female connector 4. The resulting tight fastening together of the male connector 3 and the female connector 4 generally requires less than a full turn of the barrel 18.

The male connector 3 and the female connector 4 can be quickly disconnected by rotating the barrel 18 in a counterclockwise direction. During this movement of the barrel 18, the pressure of the spring fingers 27 causes the captivated nut 17 to rotate in a counterclockwise direction thus moving its lugs 20 out of the locking areas 14 of the reentrant sections 12 and into the entrance areas 13 thereof. This functions to unlock the mating connectors 3 and 4 and enables them to be separated by merely withdrawing the barrel 18. In other words, as soon as the lugs 20 enter the entrance areas 13, the barrel 18 can be pulled backward toward the left coaxial cable 1 and the mating connectors 3 and 4 will become disconnected. This disconnection usually requires only a partial turn of the barrel 18.

What is claimed is:

1. In combination, first and second mating members adapted to be joined together by inserting at least a portion of said first mating member into at least a portion of said second mating member, and tightening means for pulling said first and second mating members tightly together in the positive manner of a threaded connection after they have been joined together by said insertion, said tightening means comprising a first cylindrical member encircling at least a portion of one of said mating members and having external threads formed thereon, a second cylindrical member surrounding said first cylindrical member and having internal threads formed therein and adapted to engage said external threads, and restrictive means for impeding rotation of said first cylindrical member in a first direction, said restrictive means including spring means positioned inside said second cylindrical member, and said first cylindrical member having means for engaging at least a portion of said spring means.

2. In combination, first and second mating members adapted to be joined together by inserting at least a portion of said first mating member into at least a portion of said second mating member, and tightening means for pulling said first and second mating members tightly together in the positive manner of a threaded connection after they have been joined together by said insertion, said tightening means comprising a first cylindrical member encircling at least a portion of one of said mating members and having external threads formed thereon, a second cylindrical member surrounding said first cylindrical member and having internal threads formed therein and adapted to engage said external threads, restrictive means for impeding rotation of said first cylindrical member in a first direction, said restrictive means including spring means positioned inside said second cylindrical member, said first cylindrical member having means for engaging a first portion of said spring means, and said tightening means further comprising a third cylindrical member, said third cylindrical member being disposed in encircling manner around one of said mating members and having means for engaging a second portion of said spring means.

3. A coupling having first and second connecting parts adapted to be joined together, said coupling comprising a first cylindrical member having internal threads and rotatably secured to said first connecting part, a second cylindrical member, means carried by said first cylindrical member for confining and locking said second cylindrical member inside said first cylindrical member whereby said second cylindrical member is captivated therein, said second cylindrical member having external threads engaging said internal threads for rotation of said second cylindrical member, holding means carried on said second connecting part for engaging at least a portion of said second cylindrical member and for holding it from rotation, and tightening means for pulling said connecting parts tightly together after they have been joined together, said tightening means including a third cylindrical member, said third cylindrical member being disposed in encircling position around said first connecting part and responsive to rotation of said first cylindrical member after said second cylindrical member has been held from rotation by said holding means, and means for attaching said third cylindrical member to said first cylindrical member for axial movement therewith.

4. A coupling having first and second connecting parts adapted to be joined together, said coupling comprising a barrel having internal threads and rotatably secured to said first connecting part, a nut, means for confining and locking said nut inside said barrel whereby said nut is captivated therein, said nut having external threads engaging said internal threads for rotation of said nut, restrictive means positioned within said barrel for impeding rotation of said nut in a first direction, said nut being adapted to be rotated in a second direction in response to rotation of said barrel in said second direction, locking means for locking said connecting parts together, said locking means including a member carried by said nut, said locking means further including means on said second connecting part for engaging and holding said member in response to rotation of said nut and said barrel in said second direction, and tightening means for pulling said connecting parts tightly together in the positive manner of a threaded connection after they have been locked together by said locking means, said tightening means comprising continued rotation of said barrel in said second direction after said member is engaged and held by said means on said second connecting part whereby said barrel advances over said nut.

5. A coupling having first and second connecting parts adapted to be joined together, said coupling comprising a barrel having internal threads and rotatably attached to said first connecting part, a captivated nut positioned inside said barrel and having external threads engaging said internal threads for rotation of said nut, restrictive means for impeding rotation of said nut in a first direction, said restrictive means comprising a spring finger secured to said first connecting part, said spring finger having an end portion, said restrictive means further comprising means carried by said nut and adapted to engage said end portion, said nut being adapted to be rotated in a second direction in response to rotation of said barrel in said second direction, locking means for locking said connecting parts together, said locking means including a member carried by said nut, said locking means further including means on said second connecting part for engaging and holding said member in response to rotation of said nut and said barrel in said second direction, and tightening means for pulling said connecting parts tightly together, said tightening means comprising continued rotation of said barrel in said second direction after said member is engaged and held by said means on said second connecting part.

6. A coupling having first and second mating parts adapted to be connected, said coupling comprising a captivated nut, said nut being annular in shape with an interior surface having at least one lug thereon, at least one reentrant section formed in said first mating part and adapted for receiving therein said lug, a barrel having internal threads formed therein and rotatably mounted on said second mating part, said nut having external threads formed thereon for engaging said internal threads whereby said nut is rotatably mounted inside said barrel, said nut being provided with detent means, said barrel having first and second ends, at least one spring finger positioned inside said barrel at said first end thereof and fixedly attached to said second mating part, said spring finger being adapted to engage said detent means for impeding rotation of said nut in a first direction while providing friction for causing said nut to rotate with said barrel in a second direction and to move toward said second end thereof, and a locking area formed in said reentrant section adapted for holding said lug and thereby terminating rotation of said nut in said second direction, and said spring finger being adapted to become compressed in response to further rotation of said barrel in said second direction.

7. A coupling in accordance with claim 6 and further comprising tightening means for pulling said mating parts tightly together, said tightening means including a cylindrical member encircling said second mating part and responsive to continued rotation of said barrel in said second direction after said rotation of said nut in said second direction has been terminated.